(12) United States Patent
Hubrich et al.

(10) Patent No.: US 7,920,627 B2
(45) Date of Patent: Apr. 5, 2011

(54) MOTION ESTIMATION EMPLOYING ADAPTIVE SPATIAL UPDATE VECTORS

(75) Inventors: Ralf Hubrich, Weiterstadt-Gräfenhausen (DE); Michael Grundmeyer, Mainz (DE)

(73) Assignee: Panasonic Corporation, Osaka (JP)

( * ) Notice: Subject to any disclaimer, the term of this patent is extended or adjusted under 35 U.S.C. 154(b) by 1437 days.

(21) Appl. No.: 11/067,649

(22) Filed: Feb. 28, 2005

(65) Prior Publication Data

US 2005/0243927 A1    Nov. 3, 2005

(30) Foreign Application Priority Data

Apr. 30, 2004   (EP) .................................... 04010296

(51) Int. Cl.
   *H04N 7/12*      (2006.01)
   *H04N 11/02*     (2006.01)
   *H04N 11/04*     (2006.01)
(52) U.S. Cl. ......... 375/240.16; 375/240.12; 375/240.24; 348/96; 348/441; 382/236; 382/238
(58) Field of Classification Search ............... 375/240.16
   See application file for complete search history.

(56) References Cited

U.S. PATENT DOCUMENTS

| 5,317,398 | A  | * | 5/1994 | Casavant et al. ............... 348/570 |
| 6,240,211 | B1 | * | 5/2001 | Mancuso et al. ............... 382/236 |
| 6,385,245 | B1 |   | 5/2002 | De Haan et al. |
| 7,480,334 | B2 | * | 1/2009 | Nair ........................ 375/240.16 |
| 2002/0126760 | A1 | * | 9/2002 | Schutten et al. ......... 375/240.16 |
| 2002/0131499 | A1 | * | 9/2002 | De Haan et al. ......... 375/240.12 |
| 2004/0008275 | A1 | * | 1/2004 | Yang et al. .................... 348/441 |

FOREIGN PATENT DOCUMENTS

| EP | 0 578 290 | 1/1994 |
| WO | 99/16248 | 4/1999 |

OTHER PUBLICATIONS

Gerard de Haan, et al., "An Efficient True-Motion Estimator Using Candidate Vectors from a Parametric Motion Model," IEEE Transactions on Circuits and Systems for Video Technology, vol. 8, No. 1, Feb. 1998, pp. 85-91.

* cited by examiner

*Primary Examiner* — David Czekaj
*Assistant Examiner* — James Pontius
(74) *Attorney, Agent, or Firm* — Wenderoth, Lind & Ponack, L.L.P.

(57) ABSTRACT

A method for motion estimation and for motion compensated interpolation. By taking a source of video data into account, a size of update vectors to be employed for determining spatial prediction vectors is set in accordance with a detected source mode. By selecting an appropriate update vector size, accuracy of predicted motion and consequently, a picture quality of motion compensated interpolated images can be increased considerably.

34 Claims, 4 Drawing Sheets

MOTION ESTIMATION EMPLOYING ADAPTIVE SPATIAL UPDATE VECTORS

BACKGROUND OF THE INVENTION

1. Field of Invention

The present invention relates to an improved motion estimation. In particular, the present invention relates to a method for estimation of a motion vector between blocks of images in a video sequence and a corresponding motion estimator.

2. Description of the Related Art

Motion estimation is employed in an increasing number of applications, in particular, in digital signal processing of modern television receivers. Specifically, modern television receivers perform a frame-rate conversion, typically in the form of an up-conversion or motion compensated up-conversion, for increasing the picture quality of the reproduced images. Motion compensated up-conversion is performed, for instance, for video sequences having a field or frame frequency of 50 Hz to higher frequencies like 60 Hz, 66.67 Hz, 75 Hz, 100 Hz etc. While a 50 Hz input signal frequency mainly applies to television signals broadcast based on PAL or SECAM standard, NTSC based video signals have an input frequency of 60 Hz. A 60 Hz input video signal may be up-converted to higher frequencies like 72 Hz, 80 Hz, 90 Hz, 120 Hz etc.

During up-conversion, intermediate images are to be generated which reflect the video content at positions in time which are not represented by the 50 Hz or 60 Hz input video sequence. For this purpose, the motion of moving objects has to be taken into account in order to appropriately reflect the changes between subsequent images caused by the motion of objects. The motion of objects is calculated on a block basis, and motion compensation is performed based on the relative position in time of the newly generated image between the previous and subsequent images.

For motion vector determination, each image is divided into a plurality of blocks. Each block is subjected to motion estimation in order to detect a shift of an object from the previous image. A time consuming full search algorithm for detecting a best match block in the previous image within a predefined search range is preferably avoided by employing a plurality of predefined candidate vectors. The set of candidate vectors includes a number of predefined most likely motion vectors.

A motion vector is selected from the candidate vectors based on an error value calculated for each of the candidate vectors. This error function assesses the degree of conformity between the current block and the candidate block in the previous image selected in accordance with the respective candidate vector. The best matching vector having the smallest error function is selected as the motion vector of the current block. As a measure for the degree of similarity between the current and the previous block, the Sum of Absolute Differences (SAD) may be employed.

The set of predefined candidate vectors may include those motion vectors as candidate vectors which have already been determined for adjacent blocks of the current image, motion vectors which have been determined for blocks in the previous image at a similar position, etc.

The article "An Efficient True-Motion Estimator Using Candidate Vectors from a Parametric Motion Model" from Gerard de Haan et al. in IEEE Transactions on Circuits and Systems for Video Technology, vol. 8, no. 1, February 1998, describes the calculation of a global motion vector as a candidate vector. The global motion vector reflects a common motion of all blocks of the image.

EP-A-0 578 290 describes further candidate vectors which are based on the motion vectors of adjacent blocks of the current image. The length and direction of these vectors is modified by adding an update vector having a random magnitude. The selection of this type of vectors as motion vector of the current block can be controlled by adding predefined penalty values to the respective SAD. In accordance with the added penalty, the likelihood to be selected as the motion vector of the current block can be respectively reduced.

In addition to image interpolation, motion estimation is further employed during the encoding of video images in order to exploit temporal redundancies. For this purpose, a plurality of video encoding standards has been developed. In wide-spread use are the encoding standards denoted as H.26x or MPEG-x.

BRIEF SUMMARY OF THE INVENTION

The present invention aims to improve motion vector estimation and to provide an improved method for determining a motion vector and an improved motion estimator.

According to a first aspect of the present invention, a method for determining a motion vector for a block of current image in a sequence of video images is provided. Each video image is divided into a plurality of blocks. The method determines a motion vector for current block by combining a previously determined motion vector and a predetermined update vector. The size of the update vector is set depending on whether or not the image data of the current block stem from a motion picture type image.

According to a further aspect of the present invention, a motion estimator for determining a motion vector for a block of current image in a sequence of video images is provided. Each video image is divided into a plurality of blocks. The motion estimator determines a motion vector for a current block by combining a previously determined motion vector and a predetermined update vector. The motion vector comprises a film mode detector and adjusting means. The film mode detector determines whether or not the image data of the current block stem from a motion picture type image. The adjusting means sets the size of the update vector depending on whether or not the image data of the current block stem from a motion picture type image.

It is the particular approach of the present invention to improve the motion vector prediction by adjusting the update vector during determination of a prediction vector for motion vector estimation. For this purpose, the type of image data is taken into account and the update vector set accordingly. If it turns out that the image data for which a motion vector is to be determined stems from motion picture film, larger differences between a previously determined motion vector and a best motion vector for the current block are to be expected. Consequently, the size of the update vector is increased for motion picture data. In this manner, a motion vector prediction for a current image block takes the characteristics of particular image types into account in order to improve motion estimation quality and to reduce artifacts visible in motion compensated images.

Preferably, a motion picture type determination is performed by detecting a conversion pattern of the video sequence. The conversion pattern reflects the pull down scheme employed during conversion from motion picture type to video type data.

According to a preferred embodiment, the image type is determined on an image basis, either per field or per frame. In this manner, a reliable motion vector estimation only requiring a low computational effort is enabled.

According to an alternative preferred embodiment, the image type, in particular film mode or video mode, is determined on a block basis. Accordingly, a more accurate determination of the present image type is possible and the present invention can be advantageously applied to a mixed type image sequences. Mixed type image sequences include image data stemming from different sources like motion picture data and video camera data.

Preferably, the size of the update vector is set by a coefficient between 1.5 and 2.5 larger than an update vector for no-motion picture type image data. Preferably, the size of the update vector is set twice as large for a film mode type image data. Accordingly, a motion vector can be accurately determined even if different motion phases are only present in every second image of the input image sequence.

The update vector, i.e. an update vector of a particular size, is preferably selected from a plurality of predetermined update vectors. In this manner, an update vector to be applied during the current motion vector estimation can be determined in a simple and efficient manner.

According to a preferred embodiment, the motion estimation is performed based on a plurality of candidate vectors. The plurality of candidate vectors includes the motion vector estimated by combining a previously determined motion vector and a predetermined update vector. Based on a limited set of candidate motion vectors, each of which providing an individual motion estimation for the current block, a motion vector determination can be performed with reliable results only employing a minimum hardware effort and a minimum number of required computation.

In order to reliably detect the motion of a current block, different motion vector predictions are provided. In particular, the different predictions are based on the same previously determined motion vector which are combined with different update vectors form a plurality of predetermined update vectors. In this manner, a best match motion vector can be determined in simple and efficient manner.

A previously calculated motion vector to be combined with the update vector is preferably selected from a zero motion vector pointing to the identical block position of a current block, a motion vector determined for an adjacent block of a current image, and a motion vector determined for a block in a previous image. In this manner, a limited number of candidate motion vectors enable an efficient and reliable motion vector determination with a low hardware and computational effort.

In contrast to a full search approach for determining a motion vector, the motion vector estimation of the present invention is preferably based on candidate vectors further including at least one from a zero motion vector pointing to the identical block position of the current block, a motion vector determined for an adjacent block in the current image and a motion vector determined for a block in a previous image. Such a limited set of motion vectors enables a fast and reliable motion vector determination.

BRIEF DESCRIPTION OF THE DRAWINGS

Other embodiments and advantages of the present invention will become more apparent in the following description of preferred embodiments, in which.

DETAILED DESCRIPTION OF THE INVENTION

The present invention relates to digital signal processing, especially to signal processing in modern television receivers. Modern television receivers employ up-conversion algorithms in order to increase the reproduced picture quality. For this purpose, intermediate images are to be generated from two subsequent images. For generating an intermediate image, the motion of moving objects has to be taken into account in order to appropriately adapt the object position to the point of time reflected by the interpolated image.

Motion estimation is performed on a block basis. For this purpose, each received image is divided into a plurality of blocks as illustrated, for example, in FIG. 1. Each current block is individually subjected to motion estimation by determining a best matching block in the previous image.

In order to avoid a time consuming full search within a predefined search area, only a limited set of candidate vectors is provided to the motion estimator. From these candidate vectors, the motion estimator selects that vector which can predict the current block from the respective block of the previous image with a minimum amount of deviation.

Figure 1:
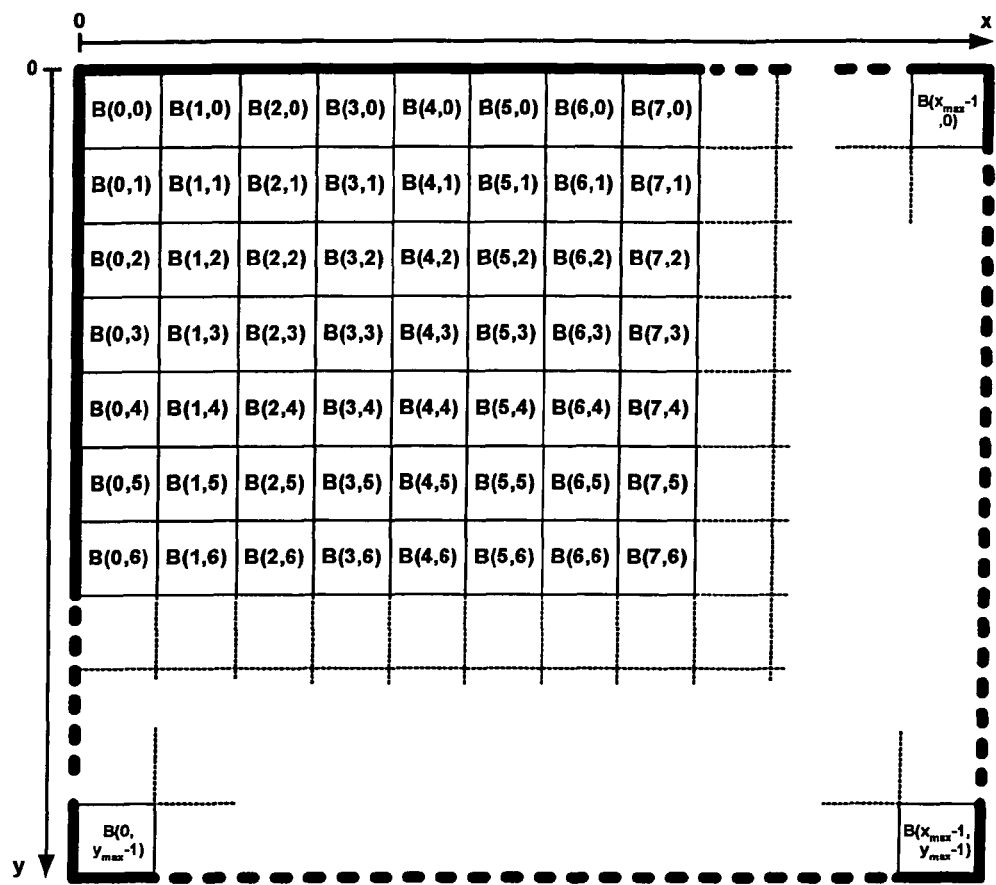
FIG. 1 illustrates a division of a video image into a plurality of blocks of a uniform size for motion estimation and compensation purposes.

FIG. 1 illustrates the division of each video image into a plurality of blocks B(x,y). Each block has a width X and a height Y wherein X and Y represent the number of pixels in the line and column direction, respectively. The number of blocks per line or column can be calculated by employing the following formulas:

$$x_{max} = \text{Pixels per line}/X; \text{ and}$$

$$y_{max} = \text{Pixels per column}/Y.$$

For each of these blocks, a motion vector is calculated from a plurality of different candidate vectors. Conventionally, the set of candidate vectors includes for instance the following motion vectors:

$C_1 = (0;0);$ $C_2 = \vec{v}[(x-1; y),n];$ $C_3 = \vec{v}[(x; y-1),n];$ $C_4 = \vec{v}[(x-1; y),n] + \vec{u};$ $C_5 = \vec{v}[(x; y-1),n] + \vec{u};$ $C_6 = \vec{v}[(x+2; y),n-1];$ and $C_7 = \vec{v}[(x; y+2),n-1],$ wherein n indicates the current field, n−1 indicates the previous field, and $\vec{u}$ represents the update vector.

As can be seen from the above equations, the candidate vectors may include a zero motion vector ($C_1$), motion vectors of adjacent blocks for a spatial prediction ($C_2$, $C_3$), and/or motion vectors of the previous image for a temporal prediction ($C_6$, $C_7$).

The spatial prediction is improved by employing update vectors which are accumulated to the spatial prediction vectors $C_2$, $C_3$. In order to take small changes of the object motion compared to a selected candidate vector into account, an update vector is applied to a motion vector to create new candidate vectors $C_4$, $C_5$. Although in the above list of candidate vectors, the update vector $\vec{u}$ is only applied to candidate vectors $C_2$ and $C_3$, it may be applied in the same manner to any other candidate vector, for instance to candidate vectors $C_6$, $C_7$.

Although the temporal prediction vectors $C_6$ and $C_7$ of the above list define the use of candidate vectors having an offset of two blocks, any other offset may be employed instead of two, for instance zero, one, three, etc.

While the temporal prediction vectors have been described with respect to a current and previous image, the term "image" may either relate to fields of an interlaced video sequence or to frames of a progressive video sequence. Correspondingly, the generated intermediate images may be fields or frames depending on the type of video sequence.

Further, the above list of candidate vectors is neither complete nor requires the inclusion of all of the above mentioned candidate vectors. Any other set of candidate vectors may be employed yielding the determination of a best match motion vector for the current block.

For each candidate vector, a prediction error is calculated and evaluated in order to determine the best match motion vector. As a measure for the prediction error, the Sum of Absolute Differences (SAD) can be determined. That candidate vector is selected and is considered to represent best the motion of the block which has the smallest SAD.

As some of the motion vector candidates $C_1$ to $C_7$ may be preferred over other candidate vectors, a programmable "penalty" may be added to the determined SAD for individual candidates. In this manner, the selection of particular candidates can be prioritized. Preferably, the penalty value is proportional to the length of the update vector $\vec{u}$ for motion vector candidates $C_4$, $C_5$.

In addition to the above list of candidate vectors, a global motion vector may be further taken into account. A global motion vector represents motion applicable to all blocks of the video image. Such motion vectors appropriately apply to a camera pan.

Figure 2:
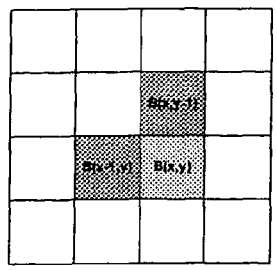
FIG. 2 illustrates a current block B(x,y) and possible spatial prediction positions.

The above listed candidate vectors $C_1$ to $C_7$ include previously calculated motion vectors from the spatial neighborhood as illustrated in FIG. 2. These candidate vectors include already processed blocks B(x−1,y) and B(x,y−1) from adjacent positions to the position of the current block B(x,y) as candidate vectors $C_2$ and $C_3$.

Figure 3:
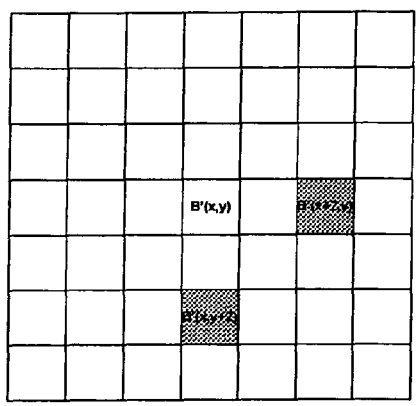
FIG. 3 illustrates a current block B(x,y) and possible spatial and temporal prediction positions.
Figure 3:
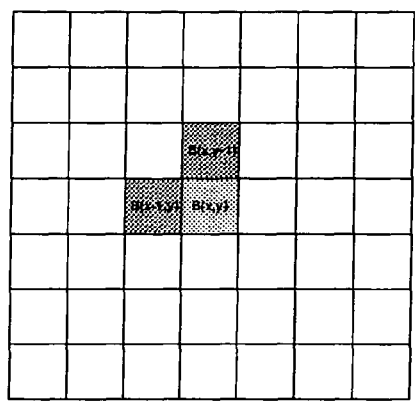

Candidate vectors $C_6$ and $C_7$ represent temporal prediction vectors representing already calculated motion vectors of the previous field n−1. An example for temporal motion prediction vectors is illustrated in FIG. 3, wherein blocks B'(x+2,y) and B'(x,y+2) are marked as prediction vectors.

The temporal prediction vectors provide a homogenous speed of a moving object if the motion of a scene is nearly constant over a number of fields. Based on the vector information generated by the motion estimation algorithm, an intermediate field is interpolated using motion compensation techniques.

Figure 4:
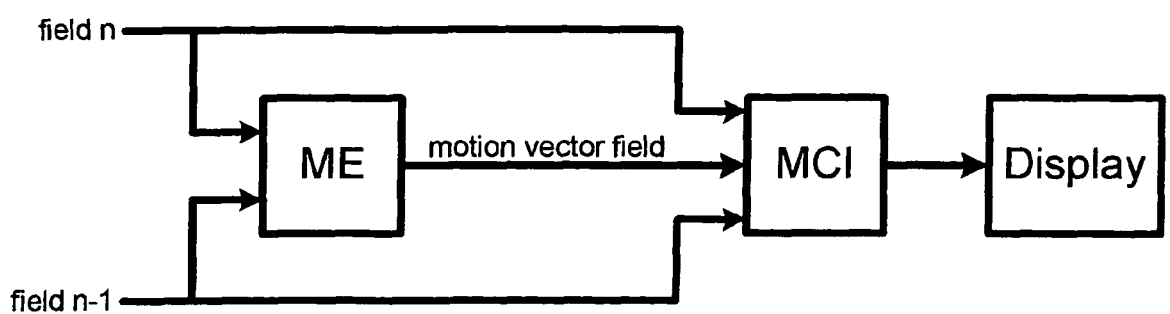
FIG. 4 illustrates a configuration of an image rate converter.

An example configuration of a known field rate converter is illustrated in FIG. 4. Motion estimation circuit ME calculates a motion vector field and supplies the motion vector field to motion compensated interpolation circuit MCI. The motion compensated output image is displayed on a connected display device.

Up-conversion algorithms which are used in high end television receivers suffer from poor image quality if the source material is originating from motion pictures. In case of fast motion, border lines of moving objects cannot be reconstructed during interpolation. This is caused by the number of estimation steps required to converge towards a correct motion vector. When employing camera source material, the number of estimation steps required to obtain the correct motion vector is only about half of the number of steps required for motion picture film. This is due to the smaller amount of motion between camera source material images compared to video sequences stemming from motion picture film.

Figure 5:
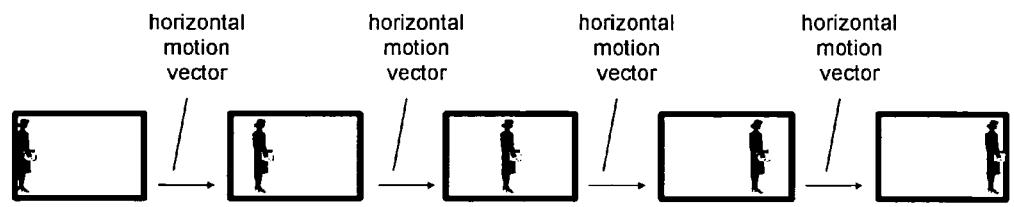
FIG. 5 illustrates different motion phases in a video sequence stemming from a video camera.
Figure 6:
FIG. 6 illustrates different motion phases of the same moving object of FIG. 5 in a motion picture sequence.
Figure 7:
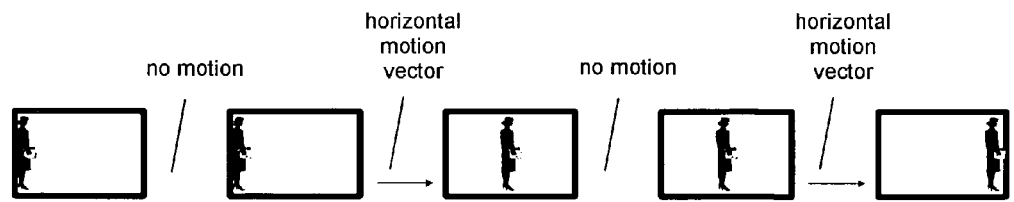
FIG. 7 illustrates different motion phases in a video sequence stemming from the motion picture sequence illustrated in FIG. 6 which has been converted in to a video sequence.

The different motion phases recorded by either a camera or a film camera and being converted from film camera motion picture data to video camera data are illustrated in FIGS. 5, 6 and 7.

FIG. 5 illustrates the motion phases recorded by an electronic camera having an interlaced recording format of a 50 Hz or 60 Hz field rate. In contrast, the same scene recorded by a film camera is illustrated in FIG. 6. Accordingly, motion picture data only reflect less motion phases compared to video data in accordance with television standards like PAL, SECAM or NTSC.

When converting motion picture data as illustrated in FIG. 6 to a television standard like video format, the motion phases from the motion pictures are repeatedly converted into a plurality of fields. As can be seen from FIG. 7, each motion phase from the motion pictures is transformed into two fields of a sequence of fields in accordance with a two-two pull down conversion.

When comparing the object positions of the different motion phases represented in the video sequences of FIG. 5 and FIG. 7, a temporal prediction based on the motion phases of FIG. 7 is rather error prone. As only fewer images of the video sequence in FIG. 7 reflect different motion phases, a temporal motion vector prediction has to cope with large shifts of the moving object between the motion phases.

Motion estimation applied to video sequences cannot accurately take both kinds of image data into account, i.e. video mode data and film mode data. Consequently, the motion vector prediction generally fails for fast moving objects stemming from motion picture. Thus, strong artifacts are visible in a motion compensated sequence of fields for fast moving objects, in particular at the border lines of the moving objects.

The present invention solves this problem by adapting the prediction motion vector size accordingly. In video mode, the spatial update vectors are set smaller while in film mode, larger update vectors are employed.

In contrast to prior art approaches applying identical update vectors to video and film mode type image data resulting in motion vector predictions which are not appropriate for both of the modes, the present invention differentiates between the different types of video data resulting in a better adapted motion vector length and direction. In this manner, the accuracy, reliability and efficiency of motion vector determination is improved.

Generally, spatial motion vector prediction as candidate vectors are defined as follows:

$C_4 = \vec{v}[(x-1;y), n] + \vec{u}$; and $C_5 = \vec{v}[(x; y-1), n] + \vec{u}$.

The update vector $\vec{u}$ is randomly chosen from a set of update vectors $SET_{update}$. This update vector is modified depending on the detected source mode for the actual search block. In case of a film source, the set of values to be used for the update vector $\vec{u}$ has to be larger than for video source data. This is due to larger motion vectors in film source material as can be seen, for instance, from FIG. 5 and FIG. 7.

In accordance with the present invention, the film mode/video mode indication is determined on a block basis. Accordingly, a status signal is assigned to each image block preferably indicating in binary form the current mode, for instance, by "0" for video mode blocks and "1" for blocks stemming from motion picture film.

In a preferred embodiment, the spatial update vector set ($SET_{update}$) is set to:

$$SET_{update} = \begin{matrix} SETu\_cam, \text{ if (block\_mode} = 0) \\ SETu\_film, \text{ else} \end{matrix}$$

The update vector sets may be assigned as follows:
$SET_{u\_cam} = \{(-1;0), (1;0), (0;-1), (0;1), (-3;0), (3;0), (0;-4), (0;4), (-8;0), (8;0)\}$; and
$SET_{u\_film} = \{(-1;0), (1;0), (0;-1), (0;1), (-5;0), (5;0), (0;-6), (0;6), (-15;0), (15;0)\}$.

For all candidate vectors, the error function, preferably as the sum of absolute differences (SAD), is calculated. According to a further preferred embodiment, the SAD values for motion vector candidates, which are determined by employing update vectors in accordance with the present invention, are modified by adding so-called penalty values. In this manner candidate vectors $C_4$ and $C_5$ may be penalised by adding a value to the SAD value, wherein the added value is proportional to the length of the update vector $\vec{u}$. The motion estimator then selects that candidate vector as the motion vector of the current block having the lowest SAD value from the penalised SAD values.

It is to be noted that a skilled person is aware that the total number of spatial update vectors and the values of the update vectors may be set differently than described above in accordance with the preferred embodiment. Instead of employing a pseudorandom selection of motion vector predictions based on respectively selected two spatial update vectors, the candidate vectors may include more than two candidate vectors which are based on the combination of a previously determined motion vector and different update vectors. Even a number of candidate vectors corresponding to all possible update vectors from the plurality of predetermined update vectors $SET_{update}$ may be employed.

While the present invention has been previously mainly described in the context of interpolation of intermediate images, in particular, for frame-rate conversion in modern television receivers, the improved motion estimation of the present invention may be applied in a corresponding manner to video data compression.

The compression of video data generally employs a number of main stages. Each individual image is divided into blocks of pixels in order to subject each image to a data compression at a block level. Such a block division may correspond to the division shown in FIG. 1. Spatial redundancies within an image are reduced by applying each block to a transform unit in order to transform the pixels of each block from the spatial domain into the frequency domain. The resulting transform coefficients are quantized, and the quantized transform coefficients are subjected to entropy coding.

Further, temporal dependencies between blocks of subsequent images are exploited in order to only transmit differences between subsequent images. This is accomplished by employing a motion estimation/compensation technique. The exploiting of temporal dependencies is performed by so-called hybrid coding techniques which combine temporal and spatial compression techniques together with statistical coding.

Figure 8:
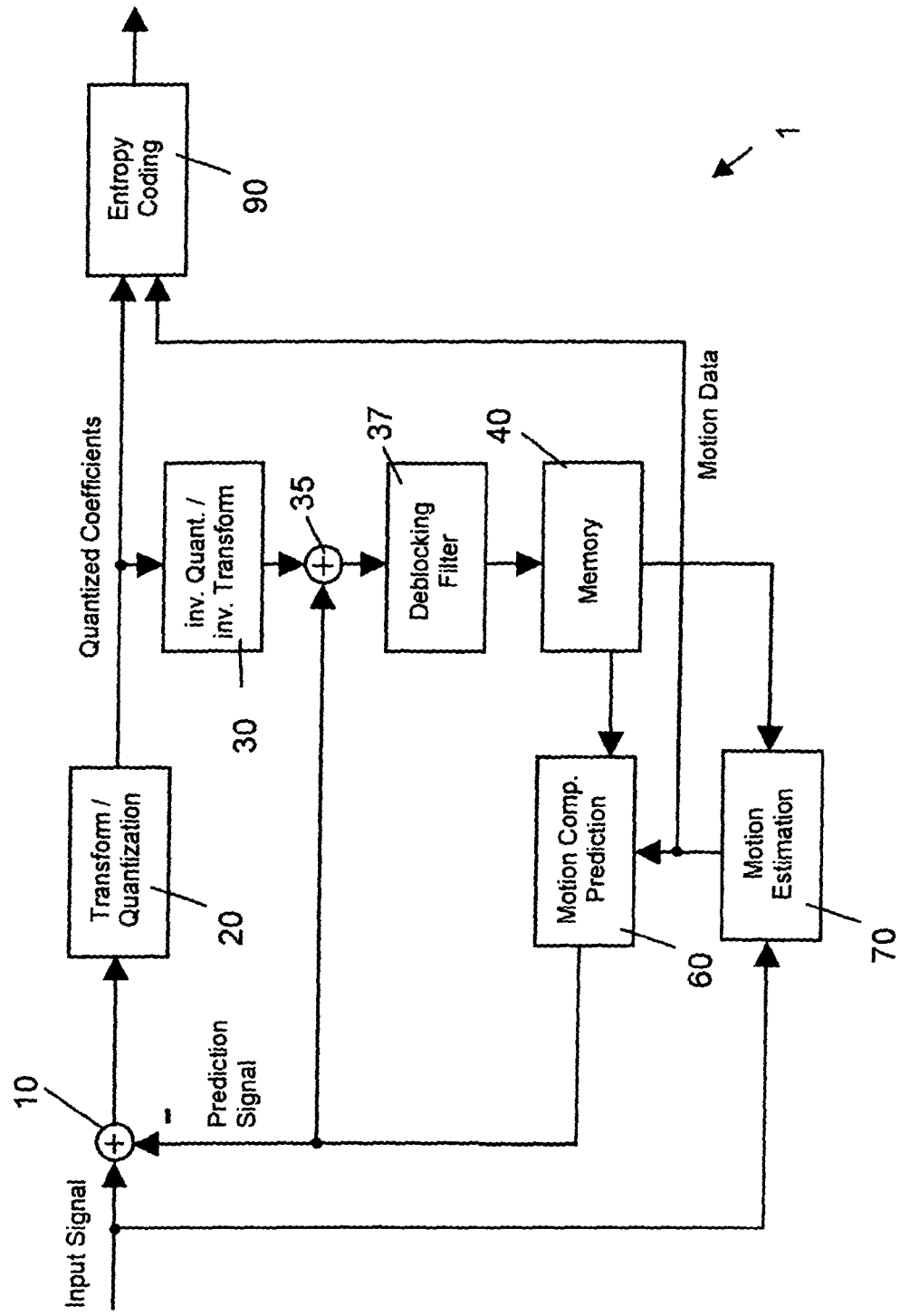
FIG. 8 illustrates a configuration of a video encoder including a motion estimator in accordance with the present invention.

Referring to FIG. 8, an example of a hybrid video encoder is illustrated. The video encoder, generally denoted by reference number 1, comprises a subtractor 10 for determining differences between a current video image and a prediction signal of the current image which is based on a motion compensated previously encoded image. A transform and quantization unit 20 transforms the prediction error from the spatial domain into the frequency domain and quantizes the obtained transformed coefficients. An entropy encoding unit 90 entropy encodes the quantized transform coefficients.

Encoder 1 employs a Differential Pulse Code Modulation (DPCM) which only transmits differences between subsequent images of an input video sequence. These differences are determined by subtractor 10 which receives the video images to be encoded and a prediction signal to be subtracted therefrom.

The prediction signal is based on the decoding result of previously encoded images on the encoder site. This is accomplished by a decoding unit incorporated into the video encoder. The decoding unit performs the encoding steps in reverse manner. Inverse quantization and inverse transform unit 30 dequantizes the quantized coefficients and applies an inverse transform to the dequantized coefficients. Adder 35 accumulates the decoded differences and the prediction signal.

The prediction signal results from an estimation of motion between current and previous fields or frames. The motion estimation is performed by a motion estimator 70 receiving the current input signal and the locally decoded images. Motion estimation is preferably performed in accordance with the present invention. Based on the results of motion estimation, motion compensation is performed by motion compensator 60.

In summary, the present invention provides an improved method for motion estimation and in particular for a motion compensated interpolation. By taking the source of the video data into account, the size of update vectors to be employed for determining spatial prediction vectors is set in accordance with the detected source mode. By selecting an appropriate update vector size, the accuracy of the predicted motion and consequently, the picture quality of motion compensated interpolated images can be increased considerably.

The invention claimed is:

1. A method for determining a motion vector for a block of a current image in a sequence of video images, the sequence of video images including image data of a film mode and a video mode, each video image of the sequence of video images being divided into a plurality of blocks, the method comprising:
   determining, using a motion estimator, a motion vector for a current block by combining a previously determined motion vector and a predetermined update vector; and
   setting a size of the predetermined update vector used for the determining of the motion vector for the current block, the size of the predetermined update vector being set to be larger when the image data of the current block is of the film mode than the size of the predetermined update vector when the image data of the current block is of the video mode.

2. The method according to claim 1, wherein a determination of whether the image data is of the film mode or the video mode is based on a detection of a motion picture to video data conversion pattern in the sequence of video images.

3. The method according to claim 2, wherein the motion picture to video data conversion pattern is a 2:2 conversion pattern or a 3:2 conversion pattern.

4. The method according to claim 1, wherein a determination of whether the image data is of the film mode or the video mode is determined on an image-by-image basis, in particular on a per field or frame basis.

5. The method according to claim 1, wherein a determination of whether the image data of the current block is of the film mode or the video mode is performed individually for the current block, independently of other blocks of the sequence of video images.

6. The method according to claim 1, wherein, when the image data is of the film mode, the size of the predetermined update vector is set between 1.5 and 2.5 times as large, preferably twice as large, in comparison to the size of the predetermined update vector when the image data is of the video mode.

7. The method according to claim 1, wherein the predetermined update vector is selected from a plurality of predetermined update vectors.

8. The method according to claim 1, further comprising:
selecting the motion vector for the current block from a plurality of candidate motion vectors including the motion vector determined by combining the previously determined motion vector and the predetermined update vector; and
assigning the selected motion vector to the current block.

9. The method according to claim 8, wherein the selecting comprises:
calculating an error value for each of the plurality of candidate motion vectors; and
selecting the motion vector of the plurality of candidate motion vectors that has a smallest error value.

10. The method according to claim 8, wherein the plurality of candidate motion vectors includes a plurality of combinations of a given previously determined motion vector with different predetermined update vectors from a plurality of predetermined update vectors.

11. The method according to claim 1, wherein the previously determined motion vector includes at least one of the following motion vectors:
a zero motion vector pointing to an identical block position of the current block;
a motion vector determined for an adjacent block in the current image; and
a motion vector determined for a block in a previous image.

12. The method according to claim 8, wherein the plurality of candidate motion vectors includes at least one of the following motion vectors:
a zero motion vector pointing to an identical block position of the current block;
a motion vector determined for an adjacent block in the current image; and
a motion vector determined for a block in a previous image.

13. A method for encoding a sequence of video images including motion compensation employing a motion vector determining method in accordance with claim 1.

14. A method for interpolating a sequence of video images including motion compensation employing a motion vector determining method in accordance with claim 1.

15. A method for converting a field- or frame-rate of a video sequence by employing motion compensation in accordance with claim 14.

16. A motion estimator for determining a motion vector for a block of a current image in a sequence of video images, the sequence of video images including image data of a film mode and a video mode, each video image of the sequence of video images being divided into a plurality of blocks,
wherein the motion estimator determines a motion vector for a current block by combining a previously determined motion vector and a predetermined update vector, and
wherein the motion estimator comprises:
a film mode detector determining whether the image data of the current block is of the film mode or the video mode, and
adjusting means for setting a size of the predetermined update vector used for determining the motion vector for the current block, the size of the predetermined update vector being set to be larger when the image data of the current block is of the film mode than the size of the predetermined update vector when the image data of the current block is of the video mode.

17. The motion estimator according to claim 16, wherein the film mode detector determines whether the image data is of the film mode or the video mode based on a detection of a motion picture to video data conversion pattern in the sequence of video images.

18. The motion estimator according to claim 17, wherein the motion picture to video data conversion pattern is a 2:2 conversion pattern or a 3:2 conversion pattern.

19. The motion estimator according to claim 16, wherein the film mode detector determines whether the image data is of the film mode or the video mode on an image-by-image basis, in particular on a per field or frame basis.

20. The motion estimator according to claim 16, wherein the film mode detector determines whether the image data of the current block is of the film mode or the video mode, individually for the current block, independently of other blocks of the sequence of video images.

21. The motion estimator according to claim 16, wherein, when the image data is of the film mode, the adjusting means sets the size of the predetermined update vector 1.5 to 2.5 times as large, preferably twice as large, in comparison to the size of the predetermined update vector when the image data is of the video mode.

22. The motion estimator according to claim 16, wherein the adjusting means comprises a memory and selects the predetermined update vector from a plurality of pre-stored update vectors.

23. The motion estimator according to claim 16, further comprising a selector for selecting the motion vector for the current block from a plurality of candidate motion vectors including the motion vector determined by combining the previously determined motion vector and the predetermined update vector.

24. The motion estimator according to claim 23, wherein the selector comprises:
a processing unit for calculating an error value for each of the plurality of candidate motion vectors; and
a comparator for selecting the motion vector of the plurality of candidate motion vectors that has a smallest error value.

25. The motion estimator according to claim 23, wherein the plurality of candidate motion vectors includes a plurality of combinations of a given previously determined motion vector with different predetermined update vectors from a plurality of predetermined update vectors.

26. The motion estimator according to claim 16, wherein the previously determined motion vector includes at least one of the following motion vectors:
   a zero motion vector pointing to an identical block position of the current block;
   a motion vector determined for an adjacent block in the current image; and
   a motion vector determined for a block in a previous image.

27. The motion estimator according to claim 23, wherein the plurality of candidate motion vectors includes at least one of the following motion vectors:
   a zero motion vector pointing to an identical block position of the current block;
   a motion vector determined for an adjacent block in the current image; and
   a motion vector determined for a block in a previous image.

28. An encoder for encoding a sequence of video images including motion compensation employing a motion estimator in accordance with claim 16.

29. An interpolator for interpolating a sequence of video images including motion compensation employing a motion estimator in accordance with claim 16.

30. A converter for converting a field- or frame-rate of a video sequence by employing motion compensation in accordance with claim 29.

31. The method according to claim 2, wherein a determination of whether the image data is of the film mode or the video mode is determined on an image-by-image basis, in particular on a per field or frame basis.

32. The method according to claim 2, wherein a determination of whether the image data is of the film mode or the video mode is determined on a block-by-block basis.

33. The motion estimator according to claim 17, wherein the film mode detector determines whether the image data is of the film mode or the video mode on an image-by-image basis, in particular on a per field or frame basis.

34. The motion estimator according to claim 17, wherein the film mode detector determines whether the image data is of the film mode or the video mode on a block-by-block basis.

* * * * *